United States Patent Office
2,760,870
Patented Aug. 28, 1956

2,760,870

MAPLE-HONEY SPREAD AND PROCESS OF MAKING THE SAME

Joseph Naghski, Philadelphia, Charles O. Willits, Glenside, William L. Porter, Philadelphia, and Jonathan W. White, Jr., Willow Grove, Pa., assignors to the United States of America as represented by the Secretary of Agriculture No Drawing. Application January 28, 1954,
Serial No. 406,905

4 Claims. (Cl. 99—142)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to maple sirup of high viscosity and high solids content and to micro-crystalline maple-honey blends and to processes for the manufacture of these products.

An object of this invention is to provide a stable, non-crystallizing, high-viscosity maple sirup. Another object is to provide a stable, micro-crystalline maple-honey blended spread having the desirable consistency of conventional maple cream or micro-crystalline honey, yet having the desirable flavors of both maple and honey products.

It has long been recognized that the unique flavors of maple sugar products and of honey form a particularly desirable blend. Since the development of the highly popular micro-crystalline honey spread and the equally popular micro-crystalline maple cream, many efforts have been made to blend the two to obtain a maple-honey spread. Heretofore, all such efforts ended in failure because the complexity and diversity of composition of the two components led to unexpected and undesirable results. Thus, if one merely mixes maple cream with micro-crystalline honey the mixture is unstable and soon liquefies. If one mixes maple sirup with liquid honey the mixture cannot be crystallized. If one concentrates standard maple sirup (65.5% total solids) to a higher solids content in an effort to facilitate crystallization of the blend, the maple sirup crystallizes prematurely while the blend still refuses to crystallize.

According to the present invention a stable, high-solids, high-viscosity maple sirup which alone does not crystallize, yet which readily mixes with liquid honey to form a crystallizable blend of highly desirable flavor and consistency can be made by concentrating maple sirup to about 75–82% solids content and then treating with invertase.

To obtain the sirup for treatment with invertase one may concentrate ordinary maple sirup of about 65.5% solids, or add water to commercial maple sugar, or similarly use a high-flavored maple sirup or sugar product. We prefer to make a high-flavored maple sirup of the desired concentration by the process disclosed in the co-pending application of two of us (C. O. Willits and W. L. Porter), Serial No. 321,958, filed November 21, 1952, and entitled "Production of Maple Sugar Products Having Enhanced Flavor." According to this preferred process, a substantially colorless and flavorless maple sirup of about 65% solids is prepared, preferably by the vacuum concentration of sap, and is then further concentrated at either atmospheric or reduced pressure to about 90% solids. This is then maintained at about from 225–260° F., preferably at about 252° F. (its atmospheric boiling point), for a time sufficient to develop maximum maple flavor. The product thus made has 10 to 20 times the concentration of maple flavor that is found in ordinary fancy maple sirup or sugar. This product may then be diluted if desired. For use in the present invention the high-flavored product is diluted with water to about 75–82% solids and is then treated with invertase.

It has been found that there is no loss of maple flavor and no development of off-flavors when maple sirup is concentrated to 70–85% solids and then treated with invertase. However, if sirup of about 65.5% solids is treated with invertase and then concentrated to 70–85% solids, very objectionable off-flavors are produced.

If ordinary or high-flavored maple sirup is adjusted to a concentration in the range 70–85% solids, the sirup is unstable and soon crystallizes. However, if it is treated with invertase before the onset of crystallization it either fails to crystallize or any crystals that form are subsequently dissolved. The sirup thus obtained will not crystallize even if seeded with crystals.

After treatment with invertase the sirup is more viscous than before, a property that makes it desirable not only for blending with honey but also for use as a table sirup or as a topping for cake, ice cream and the like. All previous attempts to make a heavy bodied pure maple sirup have failed because if ordinary sirup is concentrated to the point where the desired viscosity is attained, the sirup is unstable and soon crystallizes.

For use as a table sirup or a topping the sirup may be of any concentration up to about 85% solids, though the desirable high viscosity is not obtained below about 70% solids. For use in making the maple-honey crystallized spread, the maple sirup should be in the concentration range of about 75–82% solids in order to obtain ready crystallization and the desired "spreadable" consistency.

The invertase treatment is carried out in the same way as for the inversion of an equivalent amount of sucrose sirup. A commercial invertase preparation, such as that obtained from yeast, is mixed with the sirup and the mixture is stored for about 7 to 10 days at a temperature of about 20 to 50° C. The potency of commercial invertase preparations is usually stated by the manufacturer or may be determined by its action on a standard sucrose sirup. The preferred amount to use is such that it will produce 50 to 75% inversion of a sucrose sirup of equivalent density. Complete inversion is to be avoided as it leads to the formation of an unstable table sirup that will granulate on aging and on admixture with honey will produce a spread of hard consistency. It has been found that sirups containing 50 to 75% invert produce the desirable products. Sirups that have been inverted excessively can be corrected by the addition and admixture of sufficient pure maple sirup of equivalent density to bring the degree of inversion within to the desired range.

To make the novel maple-honey spread of this invention, the invertase treated maple sirup of about 75–82% solids content is mixed with liquid honey so that the maple sirup constitutes about 10–50% of the mixture. The liquid mixture is then seeded with dextrose crystals and stored for several days until crystallization is substantially complete. A storage temperature of 13–15° C. is preferred as it yields a product of smoother consistency. The product is a stable semi-solid of soft, buttery consistency which may be stored indefinitely at ordinary room temperature without change in appearance, flavor or consistency. The proportion in which the invertase treated maple sirup and the honey are mixed is a subjective decision largely determined by the exact flavor preferred. Because of the high cost of the maple sirup and the potency of its flavor we generally prefer to use it in the proportion of 5 to 50% of the mixture. When the preferred high-flavored maple sirup, such as that prepared by the process of the previously mentioned application of Willits and Porter, is used, then about 5% is ample to confer the desired flavor on the product. Such high-flavored maple sirup is also preferred because it contains much less of the undesirable caramel flavor and color than is found in other maple products.

We claim:

1. The process for making a micro-crystalline maple-honey spread comprising treating maple sirup of about 75–82% solids content with invertase, mixing the invertase-treated sirup with honey in the proportion of about 5–50% of sirup to 95–50% of honey, and crystallizing the product by seeding it with dextrose crystals and then holding it under conditions to produce substantial crystallization.

2. The process of claim 1 wherein the maple sirup used is high-flavored sirup made by concentrating bland sirup to about 90% solids content, heating at about 225–260° F. to develop maximum maple flavor, and diluting with water to about 75–82% solids content.

3. A micro-crystalline maple-honey spread comprising about 5–50% of invertase-treated maple sirup of about 75–82% solids content and about 50–95% of honey.

4. The process of making a stable, non-crystallizing, high-viscosity, high-flavored maple sirup which comprises concentrating a bland maple sirup to about 90% solids content, heating the concentrated sirup at about 225–260° F. until the maximum maple flavor has been developed, diluting the resulting sirup with water to a solids content of about 70–85%, and then treating the diluted sirup with invertase.

References Cited in the file of this patent
UNITED STATES PATENTS

| | | |
|---|---|---|
| 752,359 | Reed | Feb. 16, 1904 |
| 1,467,022 | Walton et al. | Sept. 4, 1923 |
| 1,987,893 | Dyce | Jan. 15, 1935 |
| 2,054,873 | Whitby | Sept. 22, 1936 |